Feb. 5, 1935.  R. W. ANGSTMAN  1,990,159
STEAM HEATING SYSTEM FOR AUTOMOBILES
Filed June 6, 1934   2 Sheets-Sheet 1
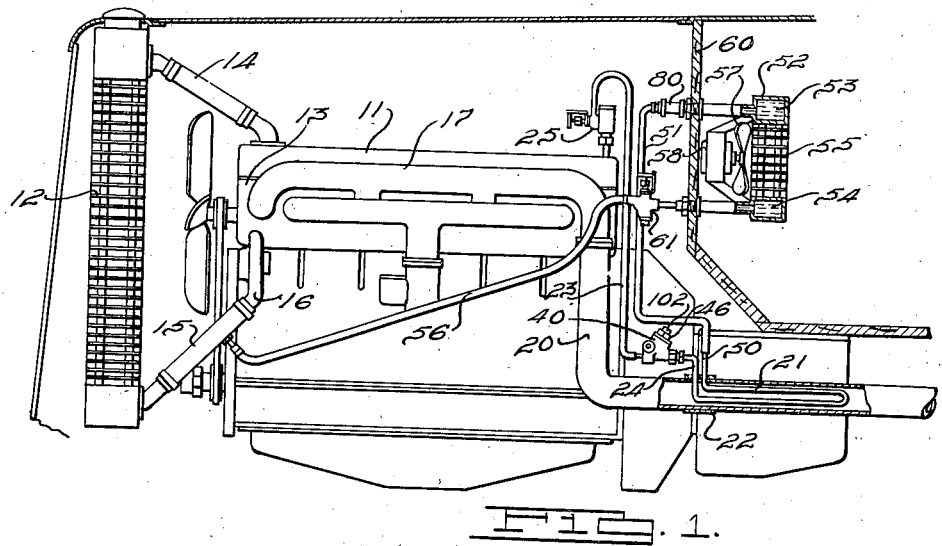
FIG. 1.
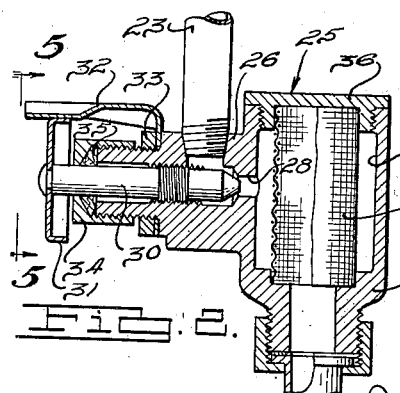
FIG. 2.
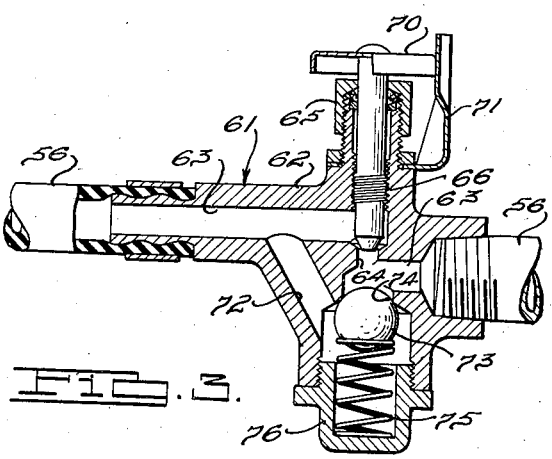
FIG. 3.
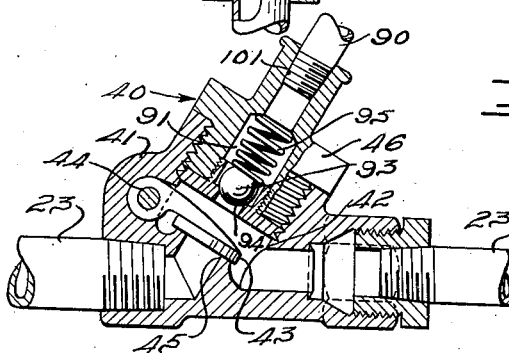
FIG. 4.
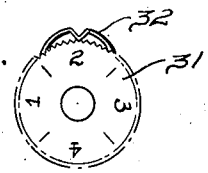
INVENTOR.
Roger W. Angstman.
BY
Harness, Dickey, Pierce & Haun
ATTORNEYS.

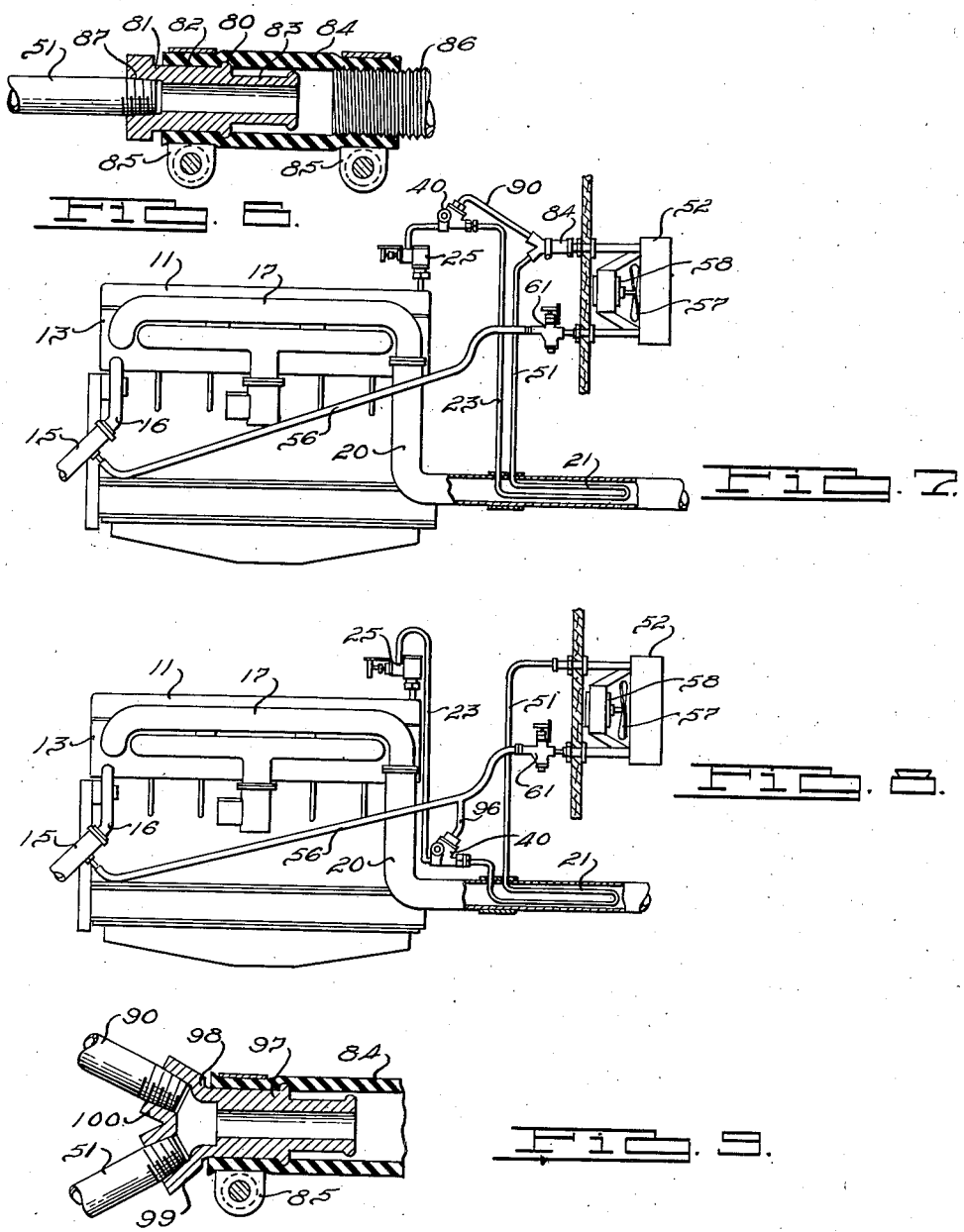

Patented Feb. 5, 1935

1,990,159

UNITED STATES PATENT OFFICE 1,990,159

STEAM HEATING SYSTEM FOR AUTOMOBILES

Roger W. Angstman, Detroit, Mich., assignor to McAleer Manufacturing Company, Detroit, Mich., a corporation of Michigan Application June 6, 1934, Serial No. 729,212

6 Claims. (Cl. 237—12.3)

This invention relates to motor vehicles heating systems, and more especially to systems which utilize the waste heat from the exhaust gases of the internal combustion engine to generate steam or vapor from the water or other liquid in the cooling system of such engine, the steam or vapor then being passed through radiators to heat the interior of the body of an automotive vehicle, or the like.

The principal object of the invention is to improve the efficiency and durability of a heating system of the above character.

Another object is to make provision for adjustably controlling the rate of flow of liquid from the cooling system of an internal combustion engine into the heating system and similarly to control the rate of flow of vapor or liquid back into the cooling system of the engine.

A further object is to provide means for increasing the effectiveness of the heating radiator or radiators especially during low speed operation of the engine of a motor vehicle.

It is also an object of the invention to provide means for separating sediment and scale from the liquid supplied from the internal combustion engine cooling system so as to prevent such foreign matter from interfering with the operation of the heating system.

Other objects, features and advantages will become apparent from the following description and appended claims.

For the purpose of illustrating the genus of the invention, several concrete embodiments of apparatus constructed and arranged according to the principles of this invention are shown in the accompanying drawings, in which:

Figure 1 is a diagrammatic side elevation, partly in section, of a portion of an automotive vehicle illustrating the application of a steam heating system to such vehicle;

Figs. 2, 3, 4 and 6 are central, vertical, and longitudinal sections of parts shown in Fig. 1;

Fig. 5 is a detail of parts shown in Figs. 1, 2 and 3;

Figs. 7 and 8 are views similar to Fig. 1, each view showing a modified form of the invention, various radiator, engine and vehicle parts being omitted; and Fig. 9 is a central, vertical section of a detail shown in Fig. 7.

Referring to the drawings, the numeral 11 indicates an internal combustion engine of the type usually employed in motor vehicles and having a radiator 12 in front of the same as a part of the cooling system of the engine, the radiator having its upper and lower portions connected with corresponding portions of the water jacket 13 of the engine by means of conduits 14 and 15, respectively. A pump 16 is interposed, in circuit, between the conduit 15 and the lower portion of the water jacket 13 to cause a forced circulation in the cooling system of the engine during the operation of the latter. The engine is provided with an exhaust manifold 17 and an exhaust pipe 20 for leading the heated exhaust gases from the internal combustion engine.

A steam generator 21 is associated with the exhaust pipe 20 and, as illustrated in Fig. 1, consists of a single reentrant tube, both ends of which may be supported by the saddle clamp 22 or other suitable means, the tube extending a substantial distance longitudinally of the pipe 20. Cooling liquid is supplied to the steam generator 21 by means of a feed conduit 23 extending from the upper portion of the water jacket 13 of internal combustion engine 11 to the entrance lead 24 of the steam generator 21. The feed conduit 23 need not necessarily be connected to the engine water jacket, but must in any event be connected into the engine cooling circuit on the pressure side of the water pump. For example, in certain types of cooling systems for internal combustion engines the pump is placed between the upper end of the water jacket and the upper end of the radiator, in which case the feed conduit 23 would be connected between the pump outlet and the top of the radiator 12. The feed water conduit 23 is provided with throttling valve means 25, interposed therein adjacent the upper portion of the water jacket 13 for the purpose of controlling the rate of flow of feed water from the cooling system of the engine to the steam generator.

Reference may now be had to Fig. 2 which illustrates the construction of the valve 25 more in detail. The supply valve 25 comprises a body casting 26 provided with a strainer chamber 27 communicating at one end with the conduit portion leading from the top of the water jacket 13 or other point in the cooling system on the high pressure side of the circulating pump, and communicating through a restricted orifice 28 leading into the side of the chamber and communicating with the portion of the conduit 23 leading to the steam generator 21. A needle valve stem 30 is threaded into the supply valve body 26 and arranged to regulate the flow through the restricted orifice 28. A needle valve adjustment knob 31 is secured to the end of the needle valve stem 30 for rotating the latter so as to regulate the effective opening of the restricted orifice 28 and thus restrict the amount of water flowing through the valve 25 so that the desired amount of water will be fed to the steam generator. Needle valve adjustment spring 32 is secured to the supply valve body 26 by means of a lock nut 33 and cooperates with the periphery of the adjustment knob so as to retain the needle valve in the desired adjusted position. A packing nut 34 and packing 35 are employed to effect a seal about the valve stem 30. One end of the strainer chamber 27 may be closed by a plug 36 threaded to the supply valve body 26 to hold the strainer 37 in position and removable therefrom for purposes of cleaning or replacing the strainer 37 which is employed to separate out scale, dirt or other foreign matter from cooling liquid passed through the valve so that such foreign matter will not be conveyed by the liquid into the heating system.

Referring now to Figs. 1 and 4, it will be noted that a check valve 40 is also interposed in the feed water conduit 23. This valve comprises a body 41 provided with a chamber 42 in which is disposed a gravity operated check valve flapper 43 pivoted to the valve body 41, as indicated at 44, and adapted to close a valve port body 45 against flow from right to left as indicated in Fig. 4 but to permit flow from left to right through the valve 40. A portion of the chamber 42 may be closed by a plug 46 threaded to the valve body 41 and removable therefrom for purposes of cleaning, inspection or replacement of the check valve flapper 43. The plug 46 may be provided with a threaded opening 101 for connecting a conduit 90 thereto, or the opening 101 may be closed by a plug 102, as indicated in Fig. 1. The check valve 40 permits flow of water from the water jacket 13 to the steam generator 21 but prevents return flow from the steam generator to the water jacket. The plug 46 may also contain safety valve means, as will later be explained.

Referring back to Fig. 1, it will be noted that the exit lead 50 of the steam generator 21 communicates through a tube 51 with the upper end of a heating radiator 52 adapted to be arranged within the body of the automotive vehicle. The radiator comprises upper and lower headers 53 and 54 and tubes 55 or other suitable heat transfer apparatus. A return conduit 56 leads from the bottom header 54 and communicates with the conduit 15 at a point adjacent the inlet of the pump 16. A fan 57 operable by a motor 58 is mounted in back of the tubes 55 or equivalent heat transfer apparatus of the radiator 52 in order to circulate air therethrough. The radiator 52 and motor and fan assembly may be connected to the cowling 60 for supporting the same or may be supported by means of the pipes leading into the upper and lower headers thereof.

Reference may now be had to Figs. 1 and 3 which illustrate the arrangement and construction of an exhaust and safety valve 61 interposed in the return conduit 56 leading back to the engine cooling system. This valve comprises a body portion 62 provided with a longitudinal passage 63 communicating at the left hand end, as viewed in Fig. 3, with the portion of the return conduit 56 and communicating at the right hand end with the portion of the return conduit leading to the radiator 52. The passage 63 is provided with a restricted orifice 64 which cooperates with a needle valve stem 65 threaded to the valve body 62, as indicated at 66, for regulating the effective area of the restricted orifice 64. The valve stem 65 is of the same construction as the valve stem 30 illustrated in Fig. 2 and is provided with a similar adjusting knob 70 adapted to be locked in fixed position by means of the needle valve adjusting spring 71. A bypass 72 is provided in the valve body 62 and communicates with the passage 63 on both sides of the restricted orifice 64. An exhaust and safety valve ball 73 is adapted to cooperate with a valve port 74 provided in the bypass 72 and is yieldably urged into position closing such port by means of a spring 75. A spring retainer nut 76 is threaded to the valve body 62 to retain the spring 75 in compressed condition to actuate the ball valve 73 to its closing position.

The exhaust and safety valve 61 is adjusted to impede the flow of water or steam through the return conduit 56 so as to increase the pressure within the radiator 52 and increase the heating effect of such radiator, especially for low operating speed of the engine 11. If excessive pressures develop within the radiator 52, these pressures will depress the ball valve 73 against the tension of the spring 75 and bypass steam or water, or both, through the bypass passage 72 into the return conduit 56 to prevent damage to the radiator. The tension of spring 75 determines the pressure at which the valve 73 will be depressed.

Reference may now be had to Figs. 1 and 6 which illustrate an adaptor and flexible tube assembly which may be employed to connect the tubes leading from the upper and lower headers 53 and 54 of the radiator 52 with the conduit 51 or 56 and at other desired points within the heating system. This adaptor comprises a body portion having various sized shoulders 82 and 83 upon which one end of a rubber hose connection 84 may be secured by means of a clamp 85, a similar clamp being employed at the opposite end of the flexible hose to metal tubing 86 leading to the radiator 52. The outer end of the adaptor body 81 may be threaded to receive a metal tube such as the conduit 51. These adaptors are employed so that various size tubes may be extended from the radiator 52, larger tubes being employed where the radiator 52 and motor 58 are to be supported from the pipes leading from the headers of the radiator construction. When the radiator 52 is supported by brackets fixed to the cowl panel 60, smaller tubes may be employed and the hose coupling connected to a smaller shoulder such as 83 on the adaptor body 81. The flexible rubber tubing is employed to obviate crystallization of the metal tubes.

Reference may now be had to Fig. 7 which illustrates a heating system similar to that disclosed in Fig. 1 except that the check 40 is disposed adjacent the supply or throttling valve 25 rather than adjacent the steam generator 21. It has been found, especially during high speed operation of the engine, that the steam pressures and temperatures are likely to develop to such extent that the super-heated steam will melt the solder used to secure joints in the radiator and cause damage and leaks. I have cured this by moving the check valve 40 in the conduit 23 away from the generator sufficiently to provide a column of water or low temperature steam between the check valve 40 and the generator 21 and by utilizing the back surges of steam from the generator 21 to force this water or low temperature steam through a bypass 90 into the steam conduit 51 for the purpose of tempering or cooling the hot steam before it reaches the radiator to such extent that it will not melt the soldered joints in the radiator 52. In the arrangement disclosed in Fig. 7 a bypass conduit 90 extends between the steam conduit 51 and the feed water conduit 23 to permit the back surges of super-heated steam from the generator 21 to force water or low temperature steam in the upper part of the conduit 23 into the steam conduit 51. A check and safety valve 91, of the construction shown in Fig. 4, is incorporated in the plug 46 and interposed in the conduit 90 and so regulated that desired pressures developed within the conduit 23 will displace a ball valve 93 from its seat 94 against the biasing action of a spring 95 and force water or low temperature steam in the upper part of the conduit 23 into the conduit 51 to temper the hot steam from the generator to obviate danger of melting solder or otherwise damaging the headers or heat transfer apparatus of the radiator.

The spring 95 of valve 91 is of sufficient strength to prevent material bleeding of fluid through the by-pass 90 during operation within usual operating ranges and is set, for example in some installations, to allow the valve 95 to open under a pressure differential of 6 to 7 pounds per square inch. The tubing of the steam generator 21 or the generator together with its connecting lines is small enough and of sufficient length to cause back pressure due to flow of fluid in the generator to build up therein at higher driving speeds when the temperature of the exhaust gases and rate of steam formation increases. This back pressure produces a pressure differential between opposite ends of the by-pass sufficient to move the ball 93 against the pressure of spring 95 so as to bleed fluid, of lower temperature than the steam from the generator, through the by-pass.

It is to be noted that the employment of means such as the by-pass 90 above described in an automobile body steam heating system forms the subject matter of a division of the present application, which divisional application was filed December 12, 1934, Serial No. 757,192.

Referring to Fig. 8, a further modification of the heating system is disclosed in which a bypass conduit 96 provides communication between the plug member 46 of the check valve 40 and the return conduit 56. In the event of undesirable increases of pressure and heat within the steam generator, the valve 91 will open, and as it communicates with the conduit 23 back of the flapper valve 43 of the check valve 40, it permits excess steam to escape through the return conduit 56 to the cooling system of the engine, thereby relieving the pressure and temperature in the conduit 51 and the radiator.

The check valve 40 in this instance should be arranged as illustrated in Fig. 8 adjacent the steam generator 21 in order that only high temperature steam will be bypassed into the return conduit 56, as in this instance the bypassed steam is not used for tempering or cooling the steam entering the radiator through conduit 51, but for exhausting some of the high temperature steam and thereby reducing or preventing increase in temperature of the steam passing to the radiator through the conduit 51. This arrangement is usually less desirable and effective than the arrangement shown in Fig. 7 although it will operate satisfactorily. One desirable feature resides in connecting the bypass into the plug 46 in the check valve 40 thereby eliminating a separate union in pipe 23. This feature is also utilized in the arrangement in Fig. 7. It is to be noted that the employment of means such as the by-pass 96 above described in an automobile body steam heating system forms the subject matter of a division of the present application, which divisional application was filed December 21, 1934, Serial No. 758,594.

Reference may now be had to Figs. 7 and 9 in which a modified type of adaptor 97 is shown differing from the adaptor 81 of Figs. 1 and 6 in that it includes a Y-branch portion 98 affording threaded connections 99 and 100 for coupling both the conduits 51 and 90 to the adaptor 97 and obviates the necessity of having a separate union in one of these conduits. This type of adaptor could be employed in the arrangement shown in Figs. 1 and 8 with a plug closing one of the branches.

As many changes could be made in the above constructions and many apparently widely different embodiments of this invention could be had without departing from the spirit thereof, it is intended that all matter contained in the above description or shown in the accompanying drawings shall be interpreted as illustrative and not in a limiting sense.

What is claimed is:

1. The combination with a motor vehicle having a body, a liquid-cooled internal combustion engine, and a liquid cooling system and exhaust pipe for the engine, of a heating system for the vehicle comprising a heating radiator mounted on said body for heating the interior thereof, a vapor generator connected with said exhaust pipe so as to be heated by the exhaust gases of the engine passing through the pipe, a conduit for supplying liquid to the generator from the cooling system for the engine, means in said conduit for restricting the rate of flow of liquid therethrough, a check valve in said supply conduit for preventing return flow of liquid from the generator to the cooling system, a conduit connecting said generator and heating radiator, a conduit connecting said heating radiator and said cooling system, and adjustable valve means disposed in said last named conduit for variably restricting the rate of flow of fluid therethrough to increase fluid pressures within and the heating effect of said heating radiator, said valve means including a bypass extending around the restricted elements of the valve, and pressure responsive means disposed in said bypass and adapted to yield at a predetermined pressure in the heating radiator to permit the increased flow of fluid to said cooling system.

2. In combination with a motor vehicle, an internal combustion engine including a liquid jacket and provided with an exhaust gas pipe, a cooling radiator, a pump, a heating radiator in the body of said vehicle, two liquid circuits each including said liquid jacket and said pump, one circuit including the cooling radiator and the second circuit including the heating radiator, said circuits being connected to each other at the inlet of said pump, both circuits being connected to the outlet side of the engine jacket, a vapor generator interposed in said second circuit between the heating radiator and said jacket and adapted to receive heat from the exhaust gases of the engine, a valve in said second circuit including a restricted orifice and filtering means interposed between the liquid jacket and the generator for reducing the rate of flow of liquid supplied to the generator, a check valve also interposed in said second circuit for preventing return flow from the generator to the engine jacket, a second valve arranged in said second circuit between said heating radiator and said pump and provided with a restricted orifice for reducing the rate of flow of fluid therethrough to increase fluid pressures within and the heating effect of the heating radiator during low speed operation of said engine and means to by-pass fluid past said last-mentioned restricted orifice when said pressure exceeds a predetermined value, said valves each including adjustable means for varying the rate of flow of fluid through the restricted orifices of each valve.

3. In combination with a water cooling system of an internal combustion engine, a heating radiator, a feed pipe connecting said cooling system and radiator, a steam generator in said feed pipe, a throttling valve in said feed pipe between said cooling system and said generator for restricting the flow of water to the generator, a return pipe connecting said radiator and cooling system, a throttling valve in said return pipe for increasing the pressures within said radiator, and a bypass connected to said return pipe on opposite sides of said last named throttling valve and including valve means yieldable at a predetermined pressure within said radiator to bypass fluid around said last named throttling valve.

4. In an automobile body steam heating system including a steam generator and a body radiator connected in series with different portions of the automobile engine cooling system and having a metering device and a check valve in the connection for conducting fluid from the cooling system to the generator, the combination with the connection for conducting fluid from the body radiator back to the cooling system, of means for metering the normal rate of flow therethrough whereby to cause a positive pressure to be built up in said body radiator during normal operation thereof, and means for temporarily rendering said metering device inoperative for metering said flow in the second mentioned connection when the pressure in said heater exceeds a predetermined value.

5. In an automobile steam heating system including a steam generating element and a heater element connected in series with each other to the automobile engine cooling system on opposite sides of the pump for said cooling system so as to normally provide for an uninterrupted and continuous flow of fluid through said heating system, and in which the inlet connection to the steam generating element from said cooling system includes a metering device and a check valve, the combination with the fluid return connection between said heater element and said cooling system of means for metering the normal rate of flow through said connection from said heater element whereby to normally maintain a materially greater pressure in said heater element than the pressure simultaneously existing in said cooling system at the inlet side of said pump, and means for releasing fluid to said cooling system from said heating system between said check valve and the last mentioned metering means at a greater rate than said metering means is adjusted to handle, when the pressure in said heater exceeds a predetermined maximum value.

6. The method of heating the body of an automobile which has an internal combustion engine and a heating system including a steam generator receiving heat from the exhaust gases of the automobile engine and a heating radiator connected to receive steam from said generator, the inlet of said generator being connected to the cooling system of said engine and the outlet from said radiator being connected to said cooling system through a return line to a point of lower pressure than the inlet to said generator, said method comprising preventing reverse flow from the generator to the cooling system, throttling the flow from said radiator to said cooling system to maintain a positive pressure in said radiator above the pressure in said return line, and by-passing said flow from said radiator past said throttling point when the pressure in said radiator exceeds a predetermined value.

ROGER W. ANGSTMAN.